March 18, 1924.

G. M. DYE ET AL 1,486,867

PHOTOPRINTING MACHINE

Filed Sept. 10, 1921     14 Sheets-Sheet 1

Inventors
Glen M. Dye
John M. Welch
By their Attorneys

Fig. 7

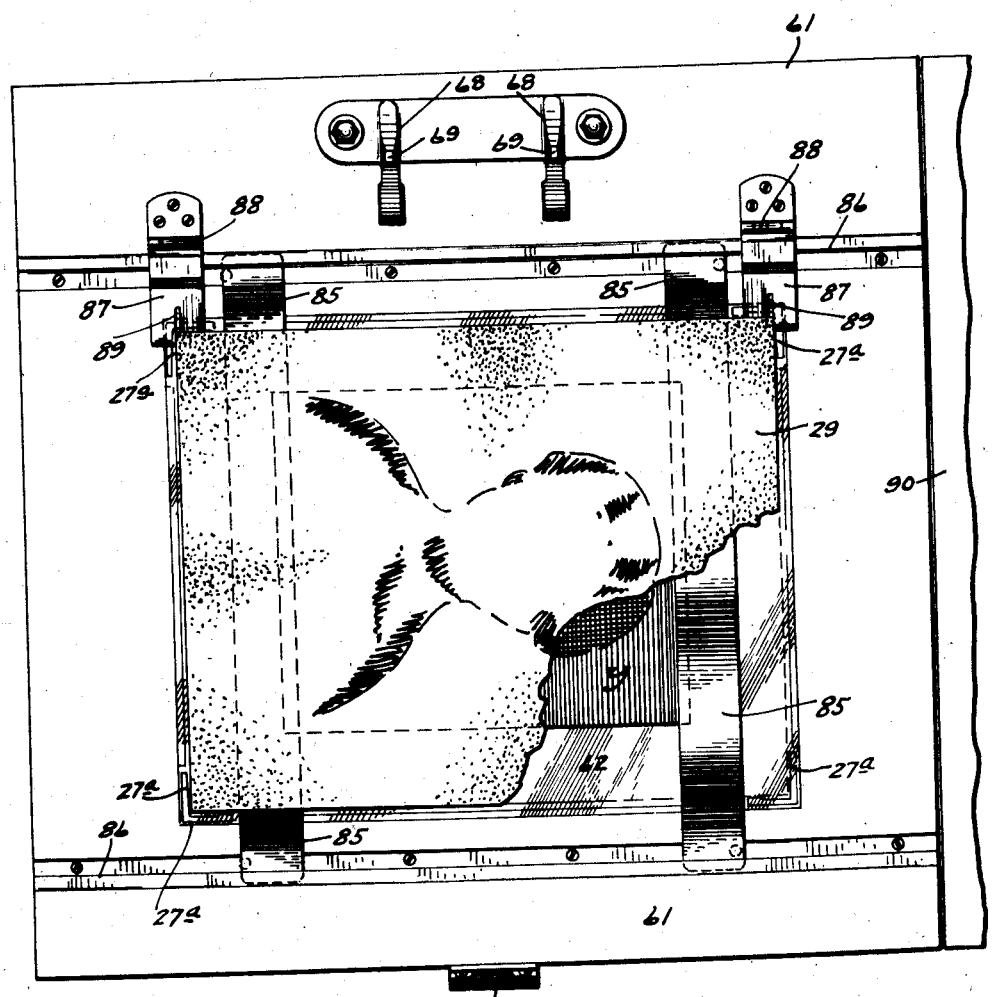

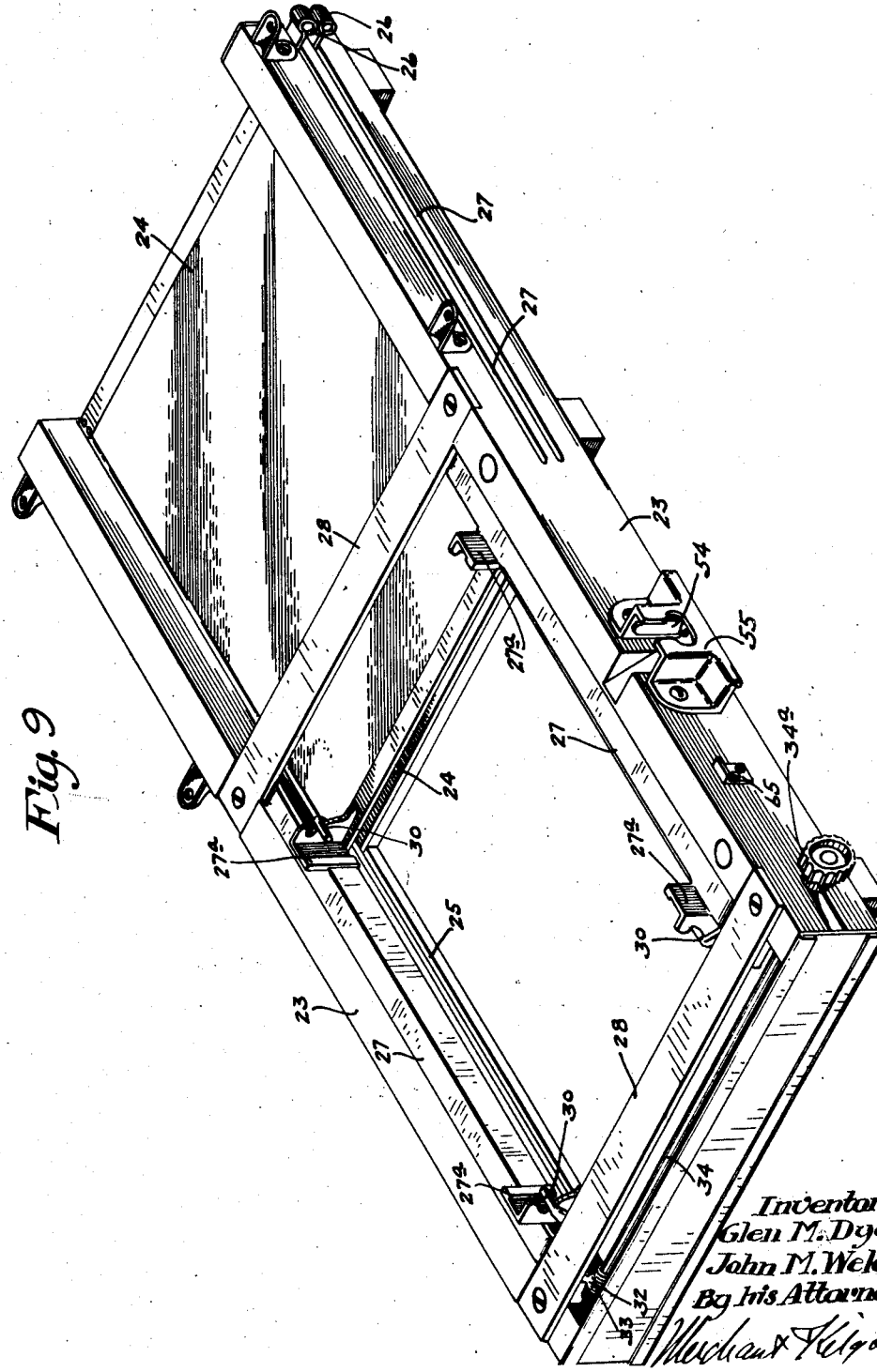

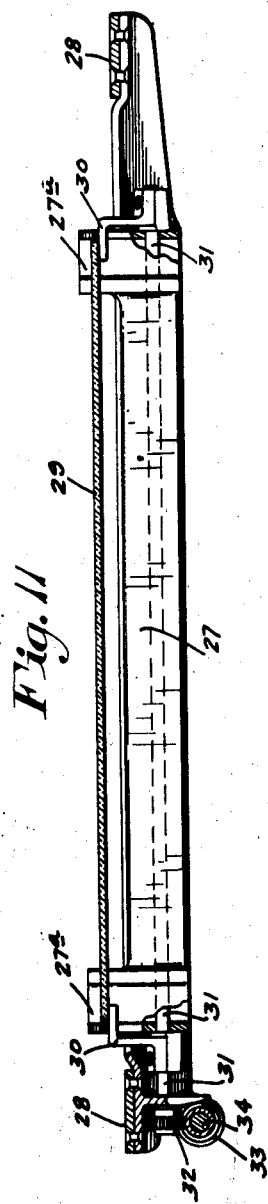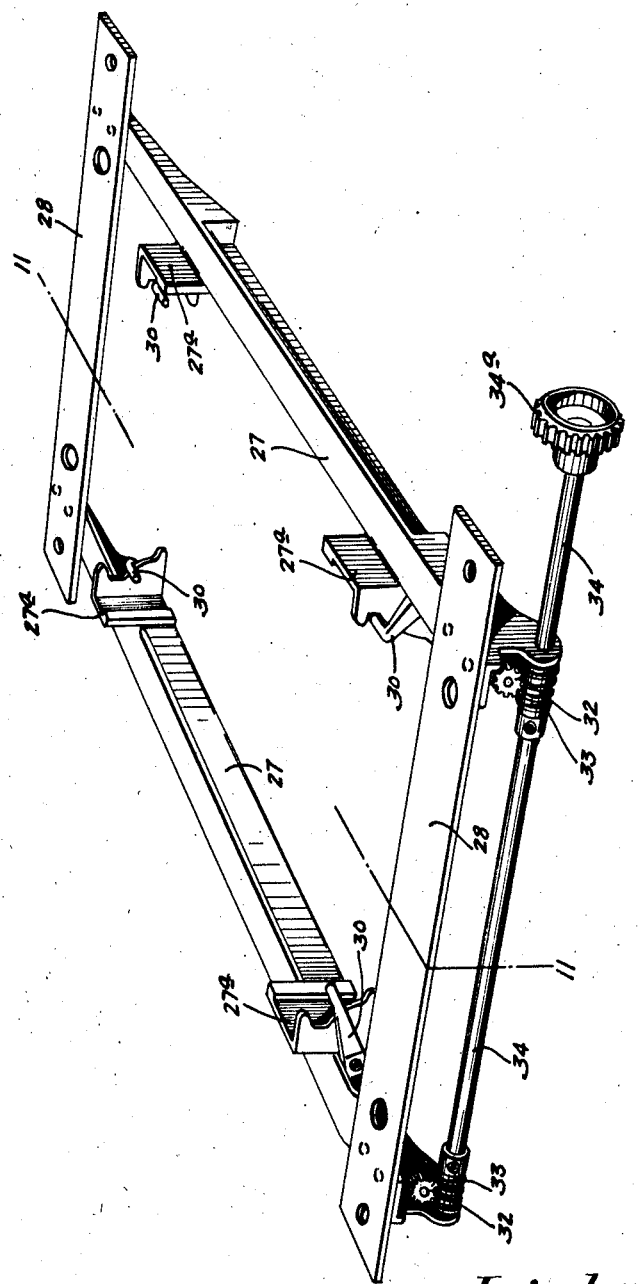

March 18, 1924.

G. M. DYE ET AL 1,486,867

PHOTOPRINTING MACHINE

Filed Sept. 10, 1921   14 Sheets-Sheet 11

Inventors
Glen M. Dye
John M. Welch
By their Attorneys

March 18, 1924.

G. M. DYE ET AL 1,486,867

PHOTOPRINTING MACHINE

Filed Sept. 10, 1921  14 Sheets-Sheet 12

Inventors
Glen M. Dye
John M. Welch
By their Attorneys
Merchant + Kilgore

March 18, 1924.

G. M. DYE ET AL 1,486,867

PHOTOPRINTING MACHINE

Filed Sept. 10, 1921    14 Sheets-Sheet 14

Inventors
Glen M. Dye
John M. Welch
By their Attorneys
Merchant Kilgore

Patented Mar. 18, 1924.

1,486,867

UNITED STATES PATENT OFFICE.

GLEN M. DYE AND JOHN M. WELCH, OF MINNEAPOLIS, MINNESOTA, ASSIGNORS TO PARKO CORPORATION, OF MINNEAPOLIS, MINNESOTA, A CORPORATION OF DELAWARE.

PHOTOPRINTING MACHINE.

Application filed September 10, 1921. Serial No. 499,632.

*To all whom it may concern:*

Be it known that we, GLEN M. DYE and JOHN M. WELCH, citizens of the United States, residing at Minneapolis, in the county of Hennepin and State of Minnesota, have invented certain new and useful Improvements in Photoprinting Machines; and we do hereby declare the following to be a full, clear, and exact description of the invention, such as will enable others skilled in the art to which it appertains to make and use the same.

Our invention relates to and provides certain highly important improvements in photographic printing machines, and generally stated the invention consists of the novel devices and combinations of devices hereinafter described and defined in the claims.

Certain of the features herein disclosed but not claimed are disclosed and claimed broadly in the application of Glen M. Dye entitled "Presser back mechanism for photoprinting machine," filed of even date herewith; and certain other features herein disclosed and not claimed are disclosed and broadly claimed in the application of John M. Welch, entitled "Hinged printing head for photo printing machine." The present invention is directed to certain features that have been jointly produced by the joint applicants herein, to-wit: the said Glen M. Dye and John M. Welch in their joint efforts to produce a commercial photo printing machine of large capacity and high efficiency which may be constructed at comparatively small cost and which may be economically shipped in knock down form and readily assembled at the place where it is to be sold or used.

Such a commercial machine is illustrated in the accompanying drawings wherein like characters indicate like parts throughout the several views.

Referring to the drawings:

Fig. 7 and Fig. 8 are plan views of the printing head illustrating the use of a modifying screen in connection therewith, the presser head being removed;

Fig. 9 is a perspective showing certain parts which make up the so-called diffusing screen assembly;

Fig. 10 is a perspective showing the elevator frame and cooperating parts that make up the so-called modifying-screen elevator.

Fig. 11 is a vertical section taken on the line 11—11 of Fig. 10;

Figure 12:
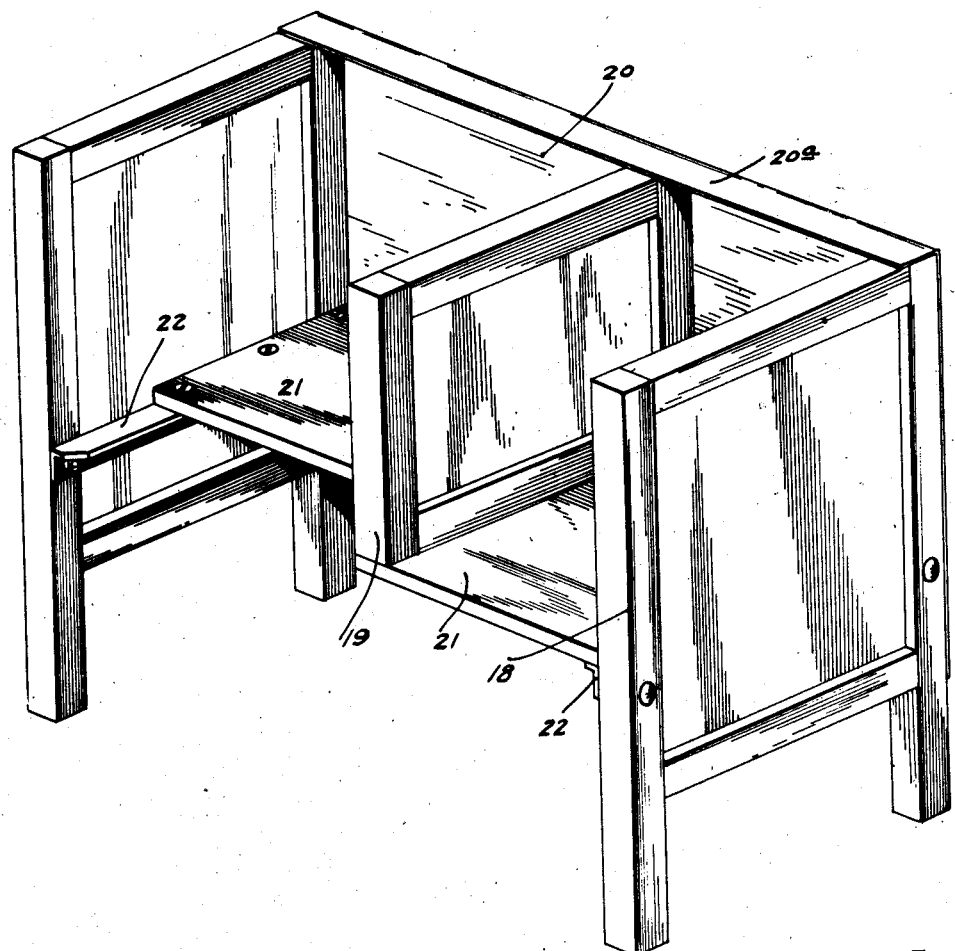
Fig. 12 is a perspective showing the so-called cabinet body assembly.

The various parts of the photo printing machine are supported directly or indirectly from the cabinet body or main frame shown in detail in Fig. 12, and heretofore referred to as the cabinet body assembly. This cabinet body is made up of end panels 18 and middle panel 19 and back panel 20, and a cabinet floor or board 21, which several parts are detachably connected and hence capable of being knocked down, packed and shipped within small space. Said elements may be detachably connected by screw bolts or otherwise but as shown the floor 21 is bolted to angle strips 22 which in turn are bolted to the end panels 18.

Figure 1:
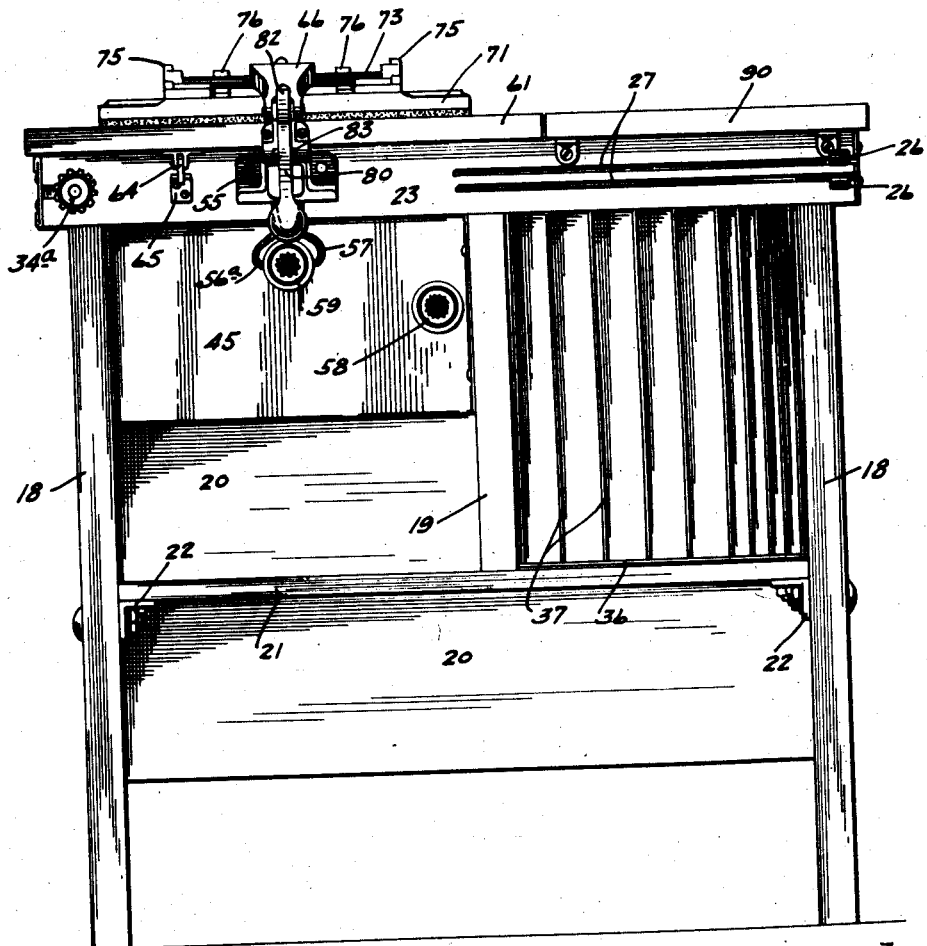
Fig. 1 is a front elevation showing the complete machine.

The so-called diffusing screen assembly shown in Fig. 9 is adapted to fit upon and to be bolted or otherwise rigidly but detachably secured to the top of the cabinet body shown in Fig. 12. The so-called diffusing screen assembly shown in detail in Fig. 9 comprises a rectangular marginal frame 23 that is adapted to be fitted upon and to be bolted or otherwise rigidly secured to the top of the cabinet body shown (see Figs. 1, 3 and 12.)

Figure 3:
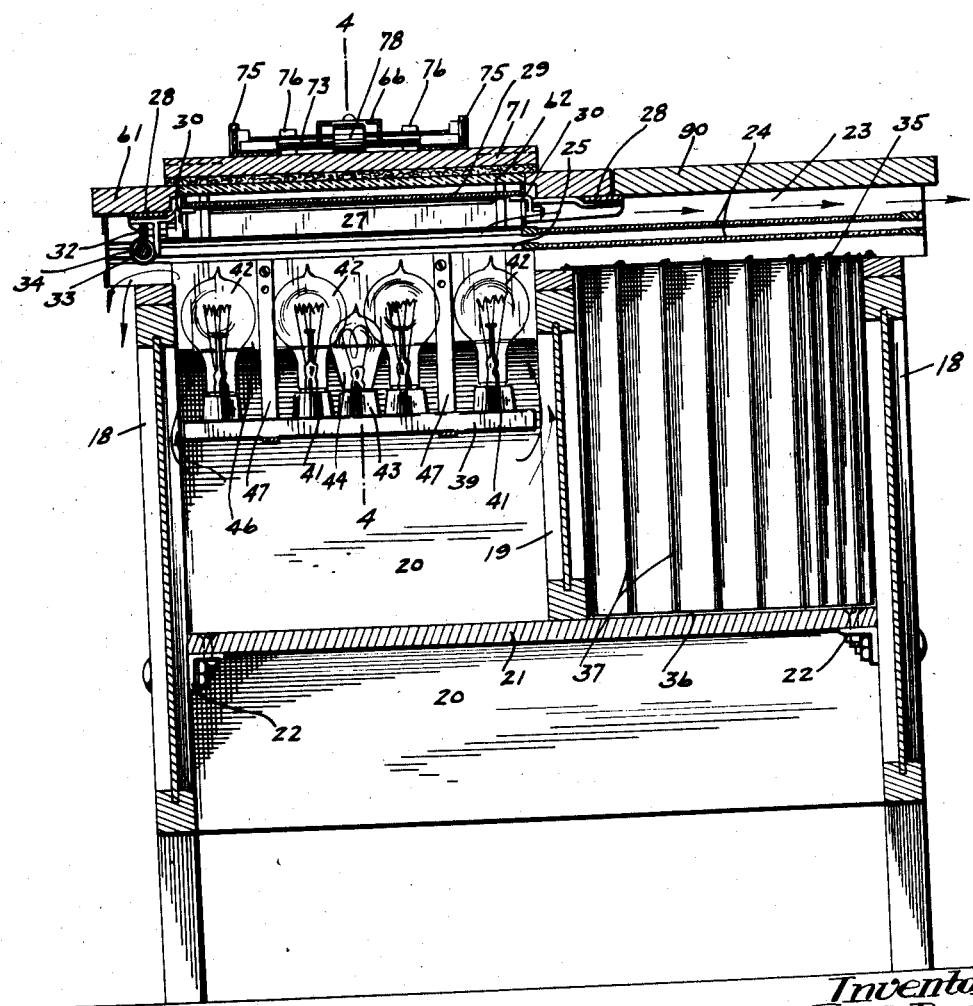
Fig. 3 is a transverse vertical section taken on the line 3—3 of Fig. 2.

The frame 23 supports several slidable diffusing screens 24 and also the modifying screen elevator which is best shown in detail in Figs. 10 and 11. The diffusing screens 24 slide in horizontal grooves or runways 25 (see Figs. 3 and 9) formed in the opposing inner faces of the front and rear rails of the frame 23; and the said screens 24 have forward projecting handles 26 that work through slots 27 in the front rail of the frame 23. Said elevator frame as shown is made up of cast front and rear bars 27 and transverse spacing bars 28 which bars are rigidly connected. The ends of the spacing bars 28 project, rest upon the top of the front and rear bars of frame 23 and are detachably secured thereto by screws or otherwise. The cast bars 27 are formed each with two vertically extended angular corner guides 27ª that are spaced to form the four corners of a rectangular parallelogram corresponding approximately to the size of the modifying screen 29. This modifying screen 29 may be of any suitable construction but preferably is a glass plate having a ground surface upon which chalk or the like may be caused to adhere for a purpose hereinafter to be described. When this modifying screen is placed with its corners in the angular guides 27ª it will be guided for true vertical movement and is adapted to be supported on the laterally turned ends of elevator arms 30 that are pivotally associated with the angular corner guides 27ª and arranged for simultaneous movement as best shown in Figs. 10 and 11. These elevator arms 30 are secured to parallel transverse rock shafts 31 that are outwardly journaled in the frame bars 27 below the tops of the latter and are provided at their left hand ends with small worm gears 32. These worm gears 32 mesh with worms 33 secured on an operating shaft 34 journaled in the pending end flanges of the frame bars 27 and provided at its front end with a knob or operating handle 34ª which is exposed at the front of the machine head. It is to be noted that the diffusing screens 24 (see particularly Figs. 3 and 4) are arranged to slide under the elevator frame and its angular corner guides, to positions immediately below the elevator frame and modifying screen and back to inoperative positions above the mask cabinet, as best shown in Fig. 3.

Figure 15:
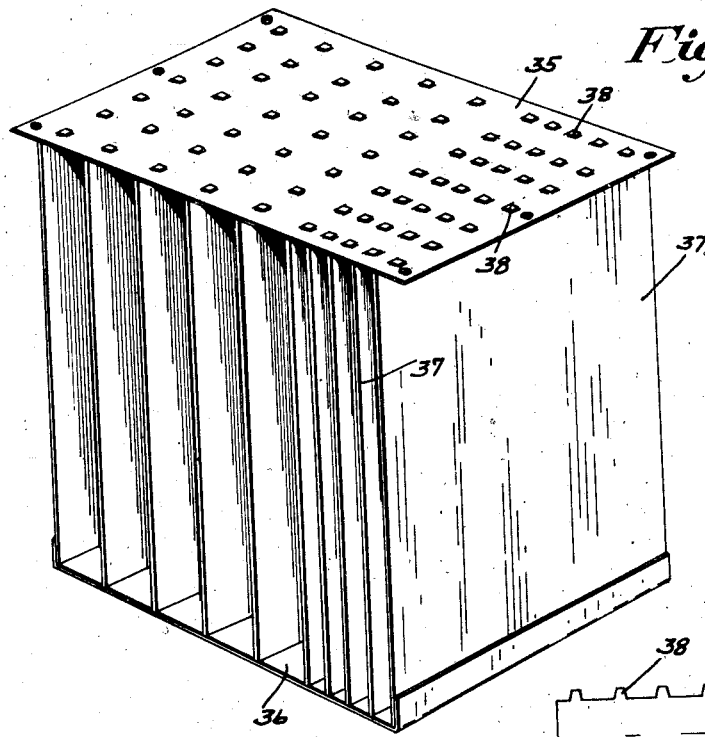
Fig. 15 is a perspective showing the so-called mask cabinet.
Figure 17:
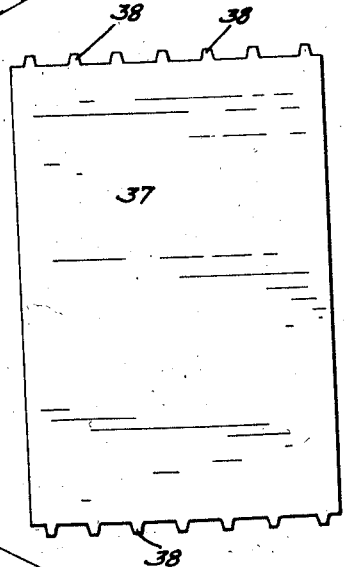
Fig. 17 is an elevation of one of the vertical plates or partitions of said mask cabinet.
Figure 16:
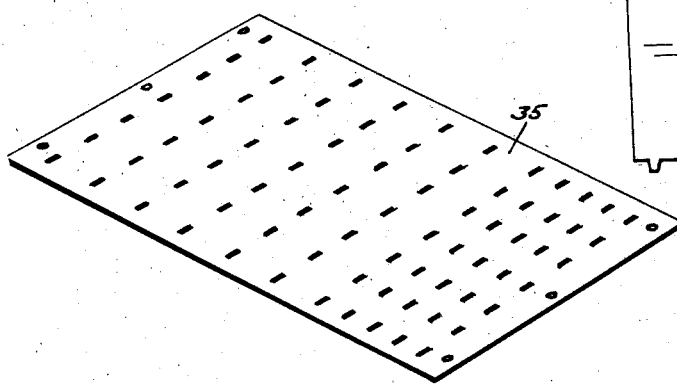
Fig. 16 is a perspective showing the top plate of the mask cabinet shown in Fig. 15.

As is obvious when the operating shaft 34 is rotated the elevator arms 30 will be moved simultaneously upward or simultaneously downward thereby raising or lowering, as the case may be, the modifying screen 29 in the corner guides 27ª. The mask cabinet shown in Fig. 15 is adapted to fit within the right hand compartment of the cabinet body shown in Fig. 12. This cabinet is preferably made entirely of sheet metal and comprises a top plate 35 and bottom plate 36, and parallel laterally spaced vertical plates 37. The vertical plates 37 are formed at their upper and lower edges with lips 38 adapted to be placed through slits in the top plate 35 and bottom plate 36 and then to be bent over or clinched to rigidly connect said parts. Preferably the bottom plate 36 is like the top plate 35 except that the ends of the former are turned upward while the ends of the latter project and are adapted to rest upon the spacer bars of the diffusing screen frame 23 and to be secured to the same by screws or the like.

Figure 13:
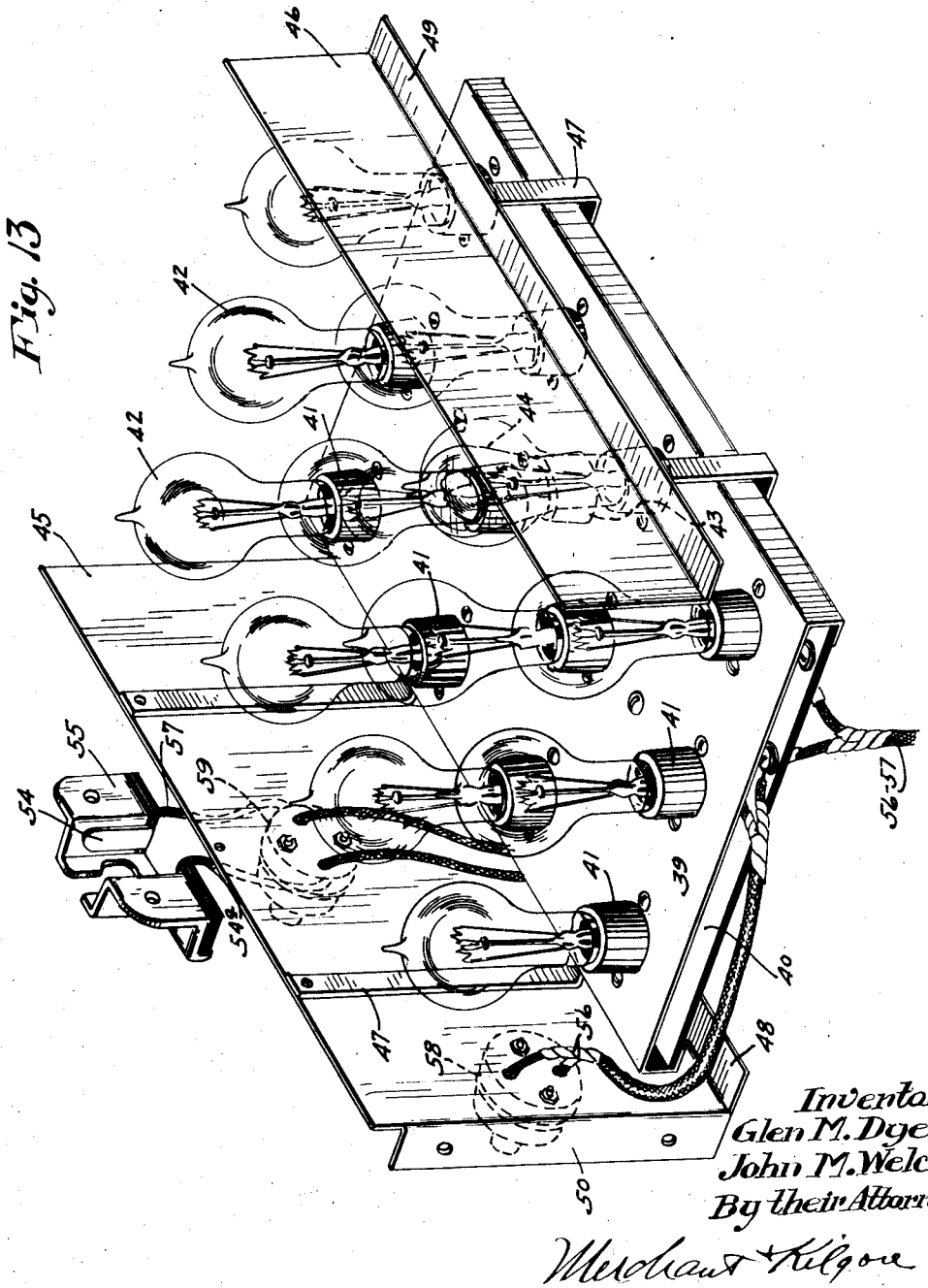
Fig. 13 is a perspective showing the lamp house and wiring assembly.

The lamp house and wiring assembly shown in detail in Fig. 13 is adapted to fit in the upper portion of the left hand compartment of the cabinet body and as shown this assembly is made up of the following elements: The numeral 39 indicates the lamp house floor which may be of sheet metal with downward and inwardly turned ends that support a panel board 40 of insulating material.

The lamp house floor 39 is provided with a plurality of lamp sockets 41 adapted to receive the actinic printing lamps or light bulbs 42, and said floor is also shown as provided with one other socket 43 which is adapted to serve a non-actinic or so-called pilot lamp or light bulb 44. The sockets 41 and 43 are of porcelain or otherwise insulated from each other. The numeral 45 indicates the front plate of the lamp house and the numeral 46 the rear plate of the lamp house. The said plates 45—46 are spaced from but rigidly secured to the floor 39 by U shaped straps 47. The front plate 45 at its lower edge has a rearwardly turned flange 48 that is spaced from the panel board 40, and the back plate 46 is provided at its lower edge with a back-turned flange 49 that is below the in-turned flange 20ª of the back plate 20.

Figure 4:
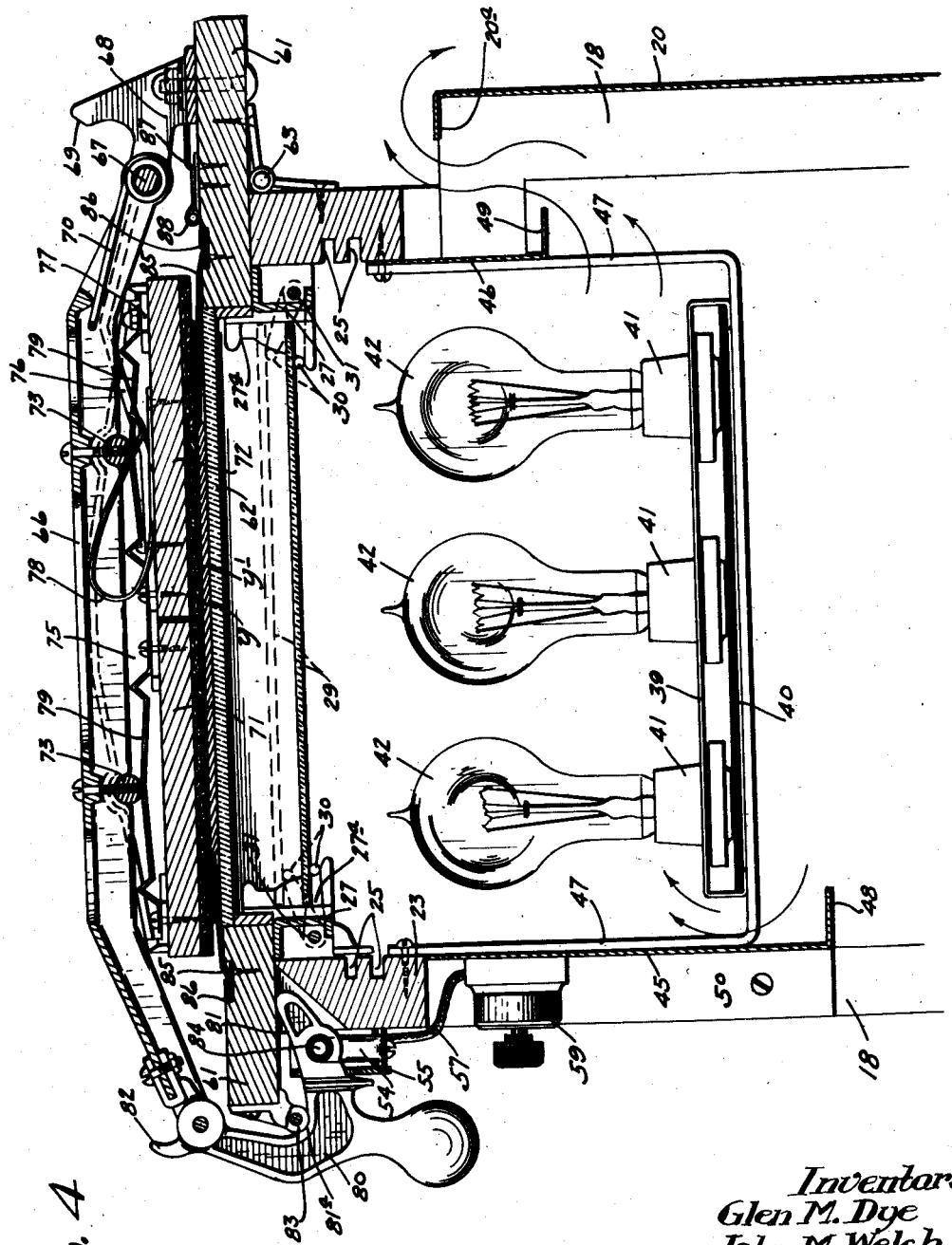
Fig. 4 is a vertical section taken from front to rear of the line 4—4 of Fig. 3.

By reference particularly to Fig. 4 it will be noted that the just described arrangement of the flanges 48—49 and 20ª provides zig-zag air passages indicated by arrows marked on Fig. 4 and through which direct light rays will not be outwardly projected from the lamp house.

The front plate 45 at its ends is shown as provided with flanges 50 that are adapted to be secured by screws or otherwise to the left hand and center panels of the cabinet body; also the hinged straps 47 (see Fig. 4) are adapted to be secured by screws or the like to the front and rear rails of the frame 23.

When the assembly shown in Fig. 13 is secured in position as just above described the front plate 45, rear plate 46 and floor 39 cooperate with the left hand panel 18 and middle panel 19 of the cabinet body to form a lamp house through which there will be ample circulation of air.

Figure 14:
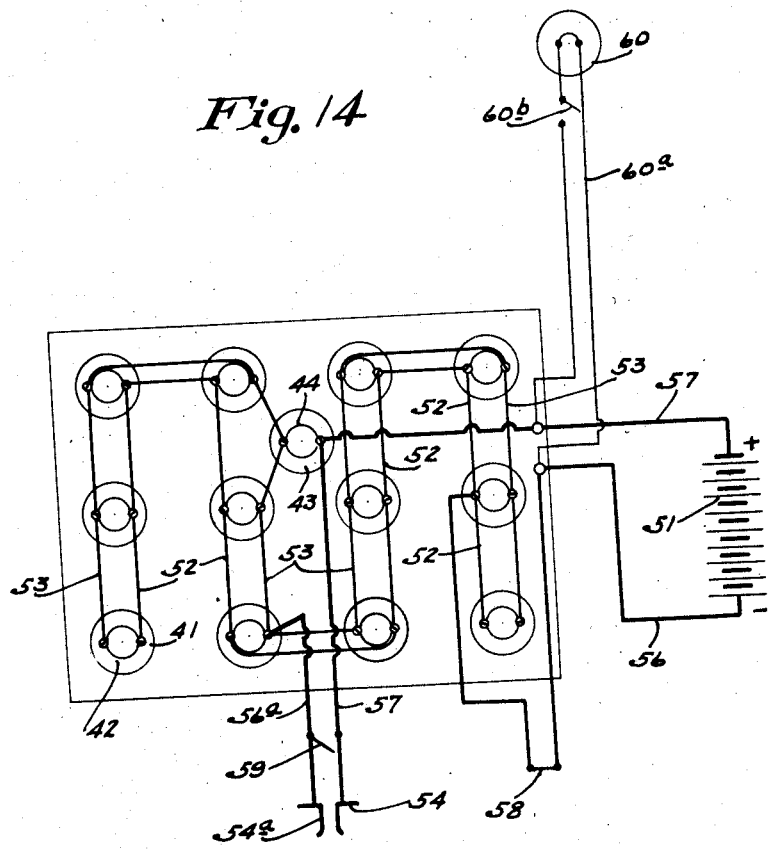
Fig. 14 is a diagram showing the electric wiring of the machine.

Attention is now directed to the diagram view Fig. 14 which shows the manner in which the printing lamps 42, pilot lamp 44 and the portable spot light and certain switches to be presently noted are connected in circuit with a battery or source of electrical energy, conventionally indicated and marked with the numeral 51. The sockets 41 for the printing lamps 42 are connected in parallel or multiple by wires 52 and 53. The so-called work switch to be presently described includes two separated spring contacts 54—54ª, diagrammatically shown in Fig. 14, and which are connected to but insulated from a supporting bracket 55 (see Fig. 13) that is secured to the upper front portion of the frame 23 (see particularly Figs. 1, 4, 6 and 9.

One terminal of the battery 51 is connected by a lead 56 with the wire 52 and the other wire 53 is connected by a secondary lead 56ª to the contact 54ª. The other terminal of the battery 51 is connected to the contact 54 by a lead 57. The lead 57 is intermediately connected to one side of the pilot light socket 43 while the other side of said socket 43 is connected to the intermediate portion of the light 53.

A switch 58 is shown as located in the lead 56. This switch will be open when the machine is to be entirely cut out of action but will be closed during all automatic actions.

The numeral 59 indicates a normally open switch connected between the leads 57 and 56ª and between the lamps and the contacts 54 and 54ª.

Figure 6:
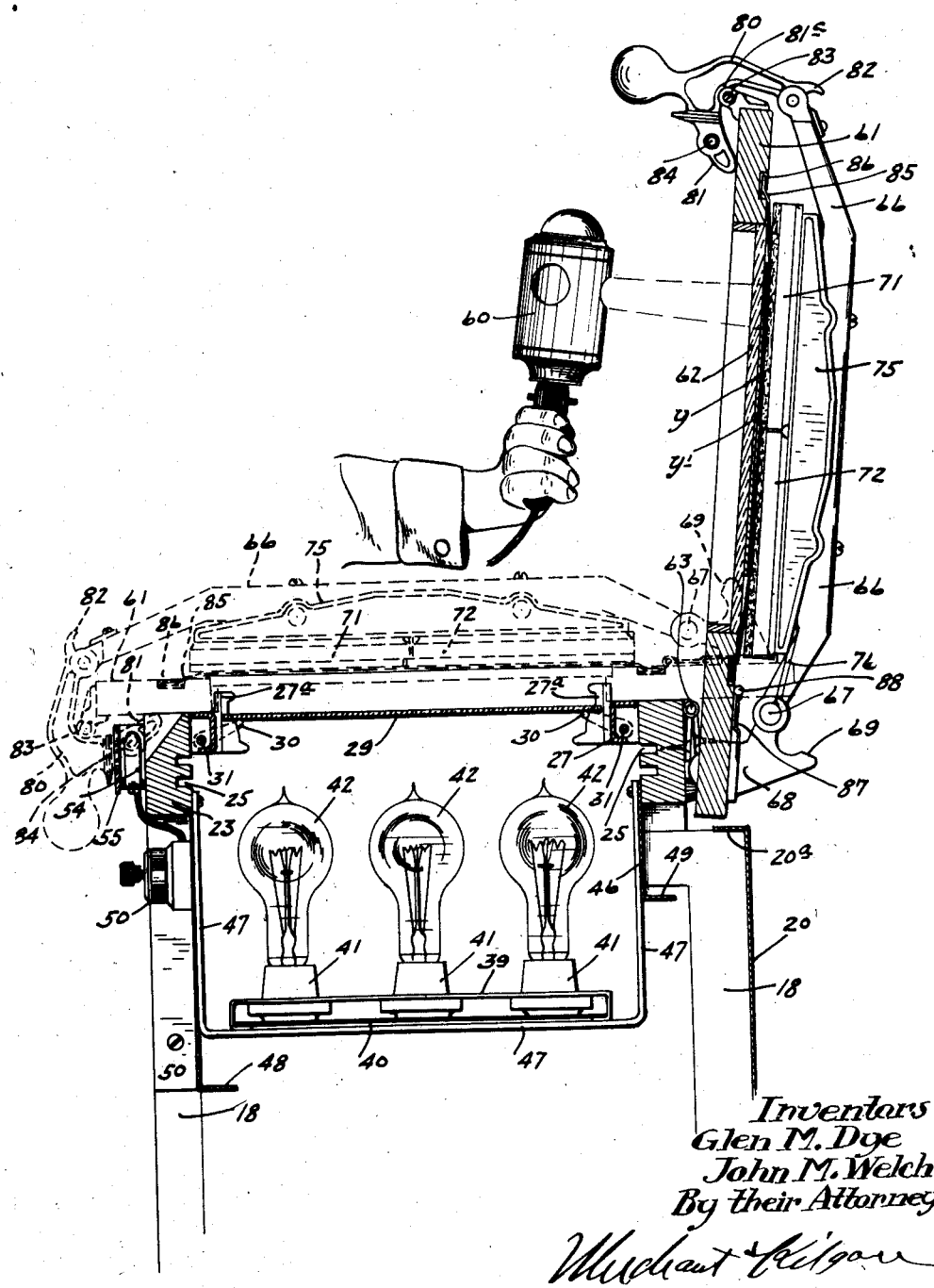
Fig. 6 is a section taken approximately on the same line as Figs. 4 and 5 but showing the printing head frame, presser board and presser lever connected together and moved into extreme raised position and illustrating also the use of a spot light.

The portable spot light 60 is preferably an electrical lamp having a suitable handle and a casing with perforation for projecting a limited or restricted light beam (see Figs. 6 and 14). This portable lamp or spot light 60 is connected in a shunt 60ª across the leads 56—57. The shunt 60ª is shown as provided with a switch 60ᵇ which when closed connects the spot light to the source of energy. The manner in which these circuits and lamps above described are operated will appear in the summary description of the operation.

Mounted on the left hand side of the so-called diffusing screen frame 23 and overlying the modified screen 29 is a so-called printing head assembly, the chief elements of which are a printing frame with glass plate therein, a two-part presser board, and a presser lever. The printing frame 61 is a rectangular structure provided with a rectangular glass plate 62 that directly overlies the modifying screen 29. Said frame 61 at its rear is hinged to the upper rear portion of the cabinet body by hinges 63 (see particularly Figs. 4, 5 and 6.) The frame 61 is adapted to be locked down in a horizontal position by any suitable means, such as an elbow latch 64, pivoted thereto and engageable with latch detent 65 on the bottom of the frame 23, which latter it will be remembered is rigidly though detachably hinged to the cabinet body.

Mounted on the printing head frame 61 is a presser lever, presser boards and certain other devices which as here illustrated constitute a mechanism designated as a presser back mechanism and which is of a type disclosed and claimed in the sole application of Glen M. Dye, already fully identified. The presser lever 66 shown is a cast skeleton member hinged or pivoted at its rear by a hinged pin 67 to lugs of a hinged bracket 68 and is bolted or otherwise rigidly secured directly to the rear portion of the printing frame 61 and is provided with lever stop lugs 69 to limit the upward movement of said lever to the position shown by dotted lines Fig. 5. The numeral 70 indicates a torsion spring applied on a hinged pivot 67 reacting against the bracket 68 and exerting a yielding force on the lever 66 which tends to hold the same in its said raised position. Front and rear presser boards 71 and 72 are connected to the presser lever 66 as follows: The front or transversely extended presser spring riders in the form of rods 73 are rigidly secured to the presser lever 66 and their ends project into open bottom portions 74 of laterally spaced so-called presser spring saddle bars 75. The front ends of the saddle bars 75 by screws or otherwise are rigidly secured to the front presser board 71, while the rear portions of said saddle bars loosely overlie the rear presser board 72 but are not directly connected thereto, and hence are capable of limited rising movements above the same for an important purpose.

The inner presser board 72 is rigidly connected to the front ends of arms or so-called hinge straps 76, the rear ends of which are pivoted on the ends of the hinged pin 67. At their rear ends the saddle bars 75 are provided with inturned projections or lift lugs 77, which when said lever has been raised approximately as shown by full lines in Fig. 5 engage the hinged straps 76 so that said lever when moved further upward will lift the rear presser board with it. The rear presser board 72, however, is yieldingly pressed downward or away from the saddle bars or presser lever by U shaped spring 78 the lower ends of which are attached to said presser board and the upper end of which bears against the rear spring rider.

The saddle bars 75 are yieldingly pressed downward and away from the presser lever 66 as far as the tops of the pockets 74 and the ends of the spring riders 73 will permit, by presser springs 79, shown as formed from flat spring metal strips located just inward of each saddle bar and extending under the front and rear presser spring riders 73.

A lock 80 for securing the presser lever in its depressed position and designed for use also as a hand piece is pivoted to the free end of the presser lever 66 and is provided with a cam-acting hook 81 that is eccentric to the axis of the pivoted connection between said lever and hand piece. The said lock 80 on its hub has stops 82 that limit its movement in respect to the presser lever 66. The eccentric cam-acting lock 81 has an inner surface which in a direction inward from its end is eccentric to and gradually approaches the axis of the pivoted connection between the lock and lever and at the inner extremity of said cam-acting surface is formed with a slight depression 81$^a$.

The cam surface of the lock 80 where the presser lever is depressed is engageable with roller equipped abutment 83 applied to the free edge of the printing head frame 61.

Figure 2:
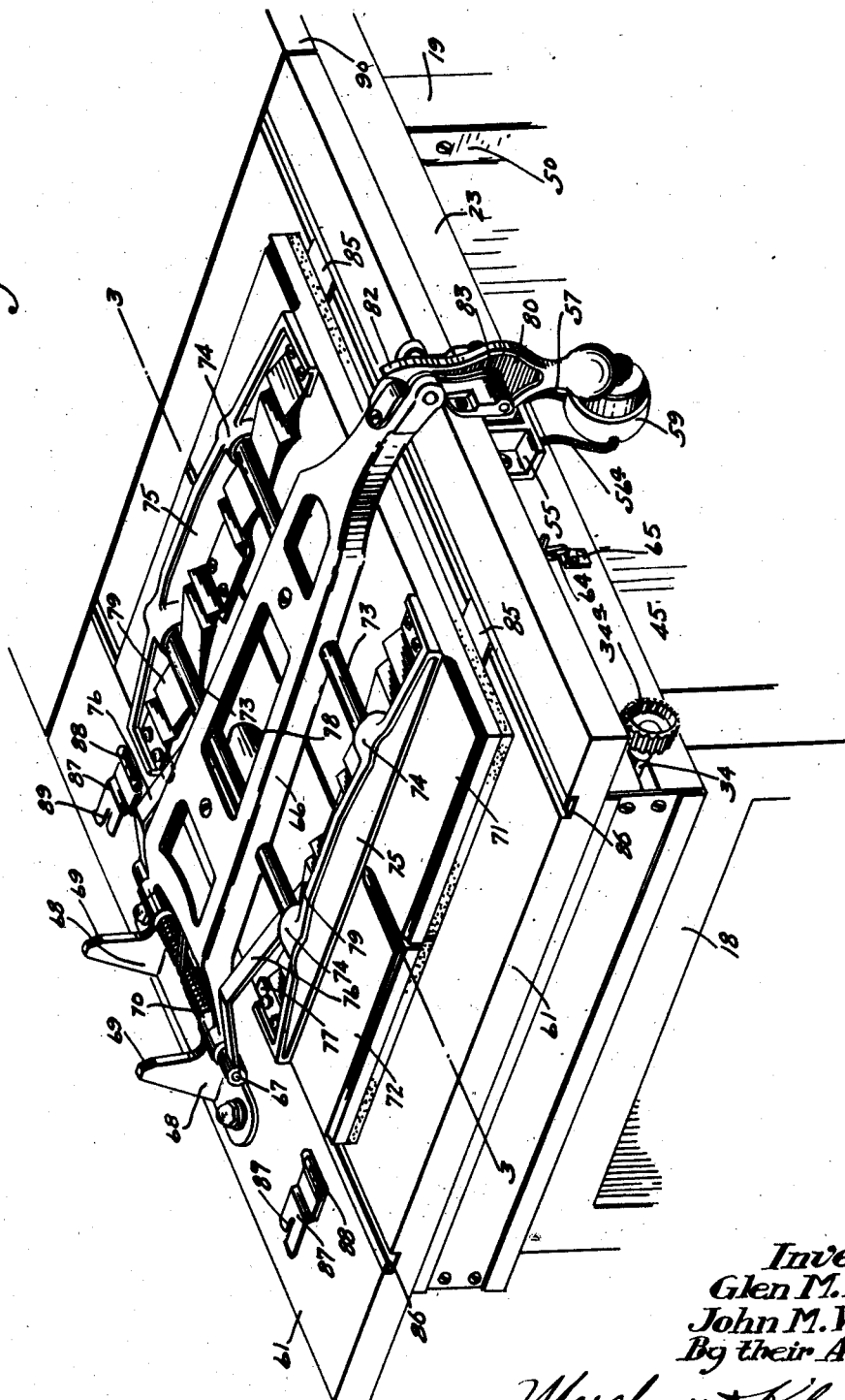
Fig. 2 is a perspective showing the upper portion.

The hook 81 of the lock 80 carries a switch element in the form of a contact pin 84 that is insulated therefrom and projects at both ends so that when the lock is forced down to locking position as shown in Figs. 2 and 4 said contact pin 84 will engage the contacts 54 and 54$^a$ of the so-called work switch and will then close the electric circuit through the printing lamps 42.

In the use of the modifying screen 29 already described and which by the elevator arms 30 is moved vertically into the corner guides 27$^a$ of the elevator structure, said modifying plate will be temporarily placed above the negative with its corners vertically aligned with the corner guides 27$^a$ and then the said modifying plate will be marked with chalk, pencil or otherwise, as, for example, illustrated in Fig. 8, so as to produce dense areas at places where there are high shadows or "thin" portions on the negative.

The above operation requires, first, efficient means for holding the negative positioned on the glass plate 62 of the printing head frame 61 and for this purpose we employ thin spring metal negative holding straps 85, the ends of which are engageable on the flanges of channel strips 86 that are secured to and imbedded in the frame 61.

Figure 7:
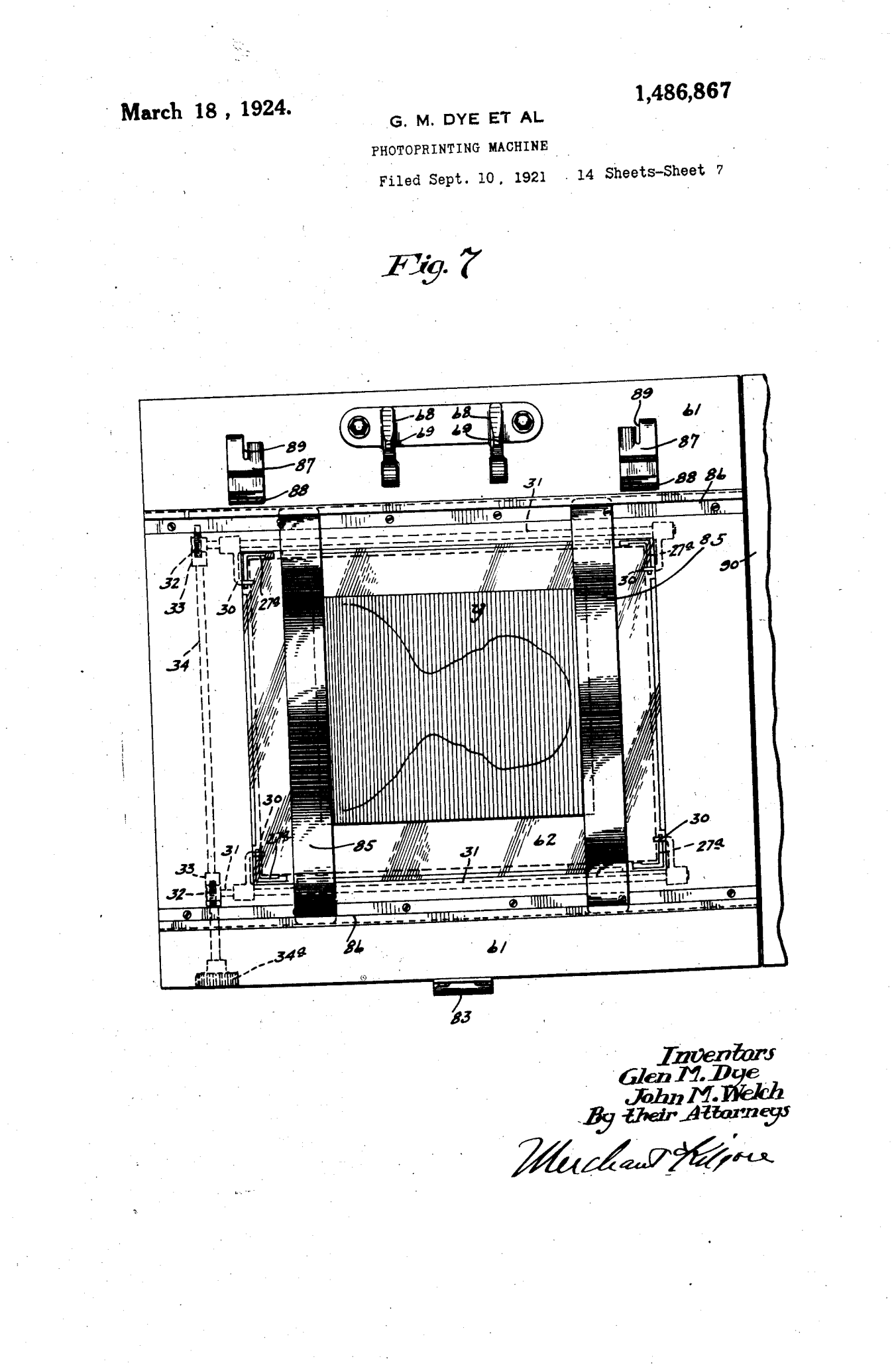

Second there should be provided means for accurately positioning the modifying screen 29 when placed above the negative with its corners vertically aligned with corner guides 27$^a$ so that marks produced on the modifying screen when it is in its elevated position will correspondingly align with the image on the negative when said modifying screen is placed in its operative position in the guides 27$^a$ and upon the elevator arms 30. The so-called register guides 87 provided for this purpose, as shown, are pressed metal elements connected to the rear portion of the printing head frame 61 by hinges 88 and provided at their free ends with right angle aligning notches 89. Said register guides 87 are arranged to engage the right and left rear corners of the raised modifying screen 29 and hence said guides are made as rights and lefts. When the modifying screen is placed above the negative for the purpose stated the register guides 87 will be turned over into operative position as shown in Fig. 8 but when the said modifying screen is removed and placed back in normal printing position said guides 87 will be turned back into inoperative position, as shown in Fig. 7, where they will not interfere with normal printing operations.

Secured on the right hand portion of the frame 23 of the diffusing screen assembly is a table board or top 90 that is preferably flush with the printing head frame 61 when the latter is turned down to operative position.

The negative is indicated by the character $y$ and the sensitized paper or print by the character $y^1$.

Operation.

The manner in which the modifying screen is used has already been described. When it is placed on the elevator arms 30 with its corners in the guides 27—27$^a$ it may be raised and lowered and set at the proper distance from the negative for producing any desired modified blending. When the modifying screen is placed about the negative while light is produced below the same it will be a very easy matter to determine just what modification and blending is desired and the markings on the modifying screen do not need to be applied in any great degree of accuracy but may be applied in a rough manner at the places where the modification in shadows is desired. Inasmuch as the marked modifying screen when placed in operative position below the negative is never in actual contact therewith, the markings on the modifying screen will not be reproduced in detail on the print but will produce the desired general shading of modifying effect.

Figure 5:
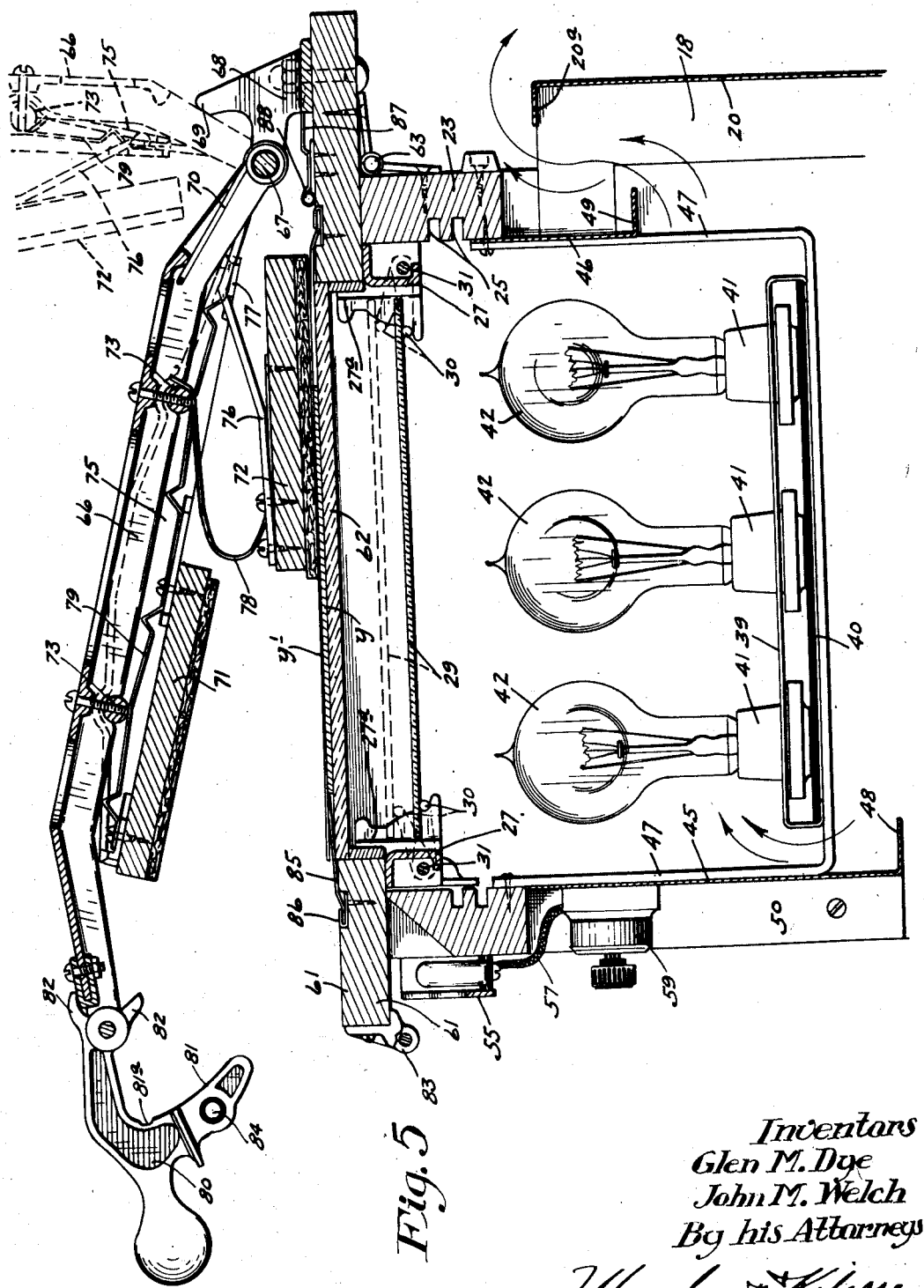
Fig. 5 is a section on the same line as Fig. 4 with certain parts raised.

The sensitized printing paper will, of course, be placed on the negative while the presser lever and presser boards are raised. When the presser lever is moved downward the rear presser board will come into engagement with the print while the front presser board is still raised approximately as shown in Fig. 5, thus permitting the print to be held by the fingers until it is engaged with the rear presser board. When the presser lever is then forced on downward the front presser board also will engage the print and when the lock 80 is then moved pivotally so as to engage its hook 81 with the abutment 83 the two presser boards will be tightly pressed against the print and negative.

The presser boards are universally adjustable to negatives, prints, printing borders, masks and the like; but this is a matter more fully described in the application of the said Glen M. Dye.

In commercial use it will be a good practise to mark corresponding negatives and modifying screens with the same number, at least when they are to be kept for future use. If this is done in the subsequent use of the two, the modifying screen will be first placed in position, then the negative can be quite readily aligned therewith when light is produced below the negative and thus it is an easy matter to reassemble the negative and modifying screen in their original or proper relative positions for printing.

The above described use of the modifying screen enables an amateur or person not highly skilled to do high grade shadow modification corresponding in many ways to retouching and to accomplish this work rapidly. Of course, the so-called markings for dense areas on the modifying screen may be produced in any suitable way but usually they would be produced by the use of chalk, crayon or pencil, or they may be applied by the use of more or less transparent paper or the like applied to the modifying screen.

It may now be observed that when the lock 80 is moved to its locking position, as above described, thereby closing the circuit between the working switch contacts 54 and 54ª, the battery or main circuit will be closed through all of the printing lamps 42 and said lamps will be connected in parallel so that all will be illuminated as required for printing. Here it is important to note that the contact 84 may be thus engaged with the working switch contacts 54 and 54ª either by pivotal movement of the lock 80 while the frame 61 and lever 66 are depressed or by a downward movement of the lock while it is engaged with the detent 83 to lock together said frame 61 and lever 66. When the circuit is broken between contacts 54 and 54ª the circuit through the printing lamps 42 will not actually be broken but the only current that can then flow through said printing lamps must also flow through the non-actinic pilot lamp 44 and this pilot lamp 44 will then be illuminated but will offer high resistance on the current flow and the small amount of current thus flowing divided between the large number of lamps 42 will not be sufficient to render said printing lamps 42 luminous. If the line switch be opened the whole lamp system will be cut out of action. On the other hand, if said switch 58 be closed and the short circuit switch 59 also closed, then the printing lamps will be constantly in circuit and hence, of course will be in circuit even when the presser lever and presser boards are raised. This permits the printing lamps to be brought into action for use when the modifying screen 29 is placed above the negative and is being marked as above described.

The portable spot light 60 will be thrown into circuit whenever the circuit 60ª is closed and this spot light may then be used for producing modified printing actions such as disclosed in the application of John M. Welch above identified.

For the purpose of shipment the cabinet body (Fig. 12) will be separated into its component five elements and these elements packed close together. The so-called diffusing screen assembly will be assembled as shown in Fig. 9 and shipped in that condition. The printing head made up of the printing frame 61, presser boards and presser lever and immediately connected parts will be assembled as shown, for example, in Fig. 2, but will be detached from the frame 23. Of the assembly shown in Fig. 9, as before stated, the elements of the cabinet (Fig. 15) will be shipped separately in closely packed condition.

The front plate 45 and rear plate 46 and brackets 47 of the lamp house assembly (Fig. 13) will be separated for the purpose of shipment and the light bulbs may be purchased when the device is to be assembled.

In assembling the machine at the place of use or elsewhere the cabinet body will be first assembled as shown in Fig. 12.

Then the diffusing screen assembly (Fig. 9) is secured on the top cabinet body (Fig. 12). Next the cabinet (Fig. 15) may be assembled, placed in the right hand compartment of the cabinet body and secured to frame 23 as already described. Then the printing head frame 61 by its hinges 63 may be attached to the frame 23 and then the table board top 90 may be applied on the frame 23. The parts of the lamp house assembly (Fig. 13) may then be connected together and inserted in the left hand compartment of the cabinet body and secured in the manner already described. Then when the various electrical circuits have been connected and the switches applied, as described, the machine will be ready for operation. Of course, the exact order of assembly of the various parts described may be varied but substantially the order named may be followed with great advantage.

The fusing screens normally are positioned under the table top 90 where they are in inoperative positions but may be readily slid into operative positions. The expression "transparent plate," as descriptive of the glass plate or the like, in the printing head frame, is used in a broad and liberal sense to include any kind of a support for the negative and print that will pass light to the print.

What we claim is:

1. In a photo printing machine, a lamp house, a printing head displaceably mounted thereon and having a transparent plate, a presser board cooperating with said plate, a screen mounted in the upper portion of said lamp house below the transparent plate of said printing head and in respect to which said printing head is movable, and two locks, the one for securing said printing head frame and presser board together for common movements to and from printing position, and the other for securing said printing head frame to said lamp house while said presser board is free to be moved to and from clamping position.

2. In a photo printing machine, a lamp house, a printing head frame displaceably mounted on said lamp house and having a transparent plate, a presser board having means for securing the same to said printing head frame for common movements therewith but capable of movements independently thereof, and a modifying screen in the upper portion of said lamp house located below said transparent plate and in respect to which said printing head frame and transparent plate are capable of movements to and from cooperative relation.

3. In a photo printing machine, a lamp house, a transparent plate applied to said lamp house in position to support a negative and print, means supporting a modifying screen in said lamp house and properly aligned with said transparent plate, and means located above said transparent plate for positioning said modifying screen while above the transparent plate and the negative, in an alignment therewith corresponding to the operative position of said screen when the latter is placed within said lamp house and below said transparent plate.

4. The construction defined in claim 3 in further combination with means for adjusting said modifying screen toward and from the negative and for maintaining its alignment therewith throughout such adjustments.

5. The structure defined in claim 3 in which the means for positioning said modifying screen above said transparent plate is a pair of corner gages mounted to move to and from operative positions.

6. The structure defined in claim 3 in which the means for positioning said modifying screen above said transparent plate is a pair of corner gages mounted to move to and from operative positions, the said corner gages having notches in their free ends for engagement with corresponding corners of the modifying screen.

7. In a photo printing machine, a lamp house, a printing head frame having a transparent plate mounted on said lamp house for movement to and from printing position, a presser back movable both with and independently of said printing head frame, a lock for securing said presser board to said printing head frame, and a lamp circuit including lamps within said lamp house and including also a working switch constructed and arranged to close said circuit by a movement of said lock to and from operative position while said presser board is clamped to said printing head frame.

8. The construction defined in claim 7 in which said working switch will be closed also by movement with said printing head frame and presser board when the two are moved while locked together by said lock.

9. The combination of a lamp house, of a printing head frame hinged to said lamp house and having a transparent plate, of a presser board mounted for movement both with and independently of said printing head frame, a presser head lever hinged to head frame and yieldingly operative on said presser board, a lock pivoted to said lever and engaging with a lock abutment on said printing head frame, and an electric circuit including printing lamps within said lamp house, and a work switch arranged to be closed by a movement of said pivoted lock to working position while said frame is in lowered or printing position.

10. The combination of a lamp house and a transparent plate connected therewith and a modifying screen, of means for vertically adjusting the modifying screen in the upper portion of the lamp house, corner guides engageable with the corners of said modifying screen to maintain its alignment with the negative throughout its adjustment, and corner gauges on the outer side of said transparent plate having portions vertically aligned with corner guides, to position the modifying screen above the negative in the same alignment therewith as determined by said corner guides.

11. In a photo printing machine a lamp house, a printing head frame with a transparent plate at the top of said lamp house, a modifying screen in the upper portion of said lamp house, below said transparent plate, vertical corner guides engaging with the corners of said modifying screen, elevator arms associated with said corner guides and supporting said modifying screen, and means for simultaneously moving the several elevator arms to adjust said modifying screen toward and from the negative.

12. The construction defined in claim 11 in which said adjusting means comprises two rock shafts to which said elevator arms are connected in pairs, worm gears on said rock shaft, and an operating shaft having worms engaging the respective worm gears.

13. A photo printing machine comprising a cabinet body, a printing head assembly, a diffusing screen assembly, a lamp house and a wiring assembly constructed as self-contained individual units and assembled and connected to form a complete machine.

14. The construction defined in claim 13 in which said cabinet body is a knock-down structure, the elements of which when operated are capable of being packed in a small space.

15. The structure defined in claim 13 in which said cabinet body has two compartments, in one of which the lamp house and wiring assembly are placed, and the other of which is equipped with a removable cabinet.

16. In a photo printing machine, the combination with a transparent plate and its support, of a presser board, a hinged presser lever yieldingly operative on said presser board, locking means for securing said lever and presser board in depressed positions, said locking means including a lock piece that is movable to and from locking position while said lever is depressed and independently of movements of said lever, and a lamp circuit having contacts arranged to be engaged to close said circuit, by movement of said lock piece to locking position while said lever is depressed and independently of movements of said lever.

In testimony whereof we affix our signatures.

GLEN M. DYE.
JOHN M. WELCH.